Dec. 19, 1933.　　　G. E. GAGNIER ET AL　　　1,940,540
AUTOMOBILE SUN AND GLARE SHIELD
Filed March 12, 1930　　　2 Sheets-Sheet 1
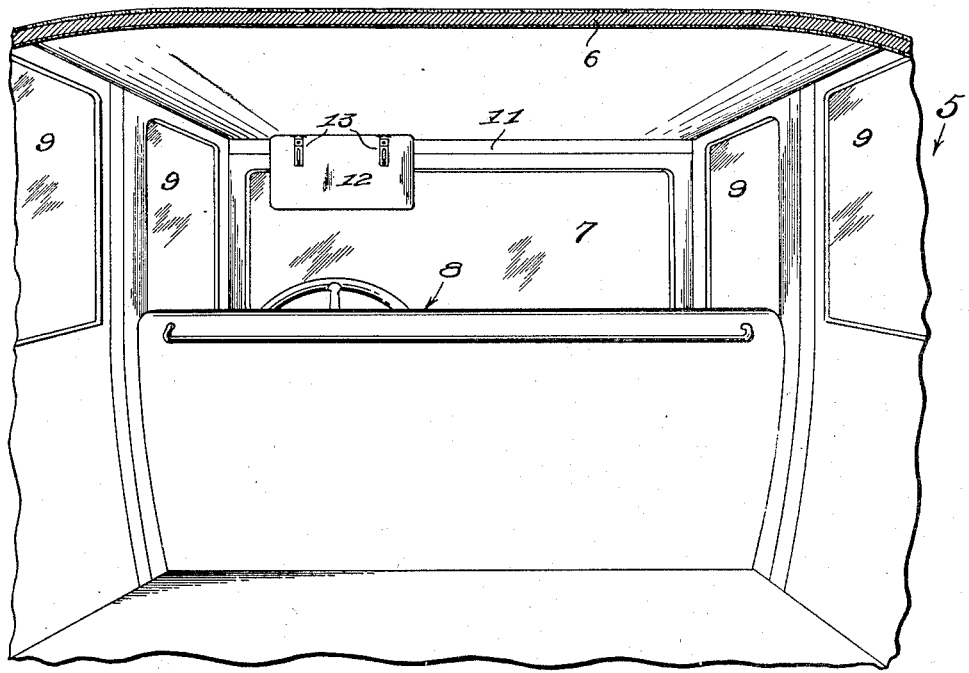
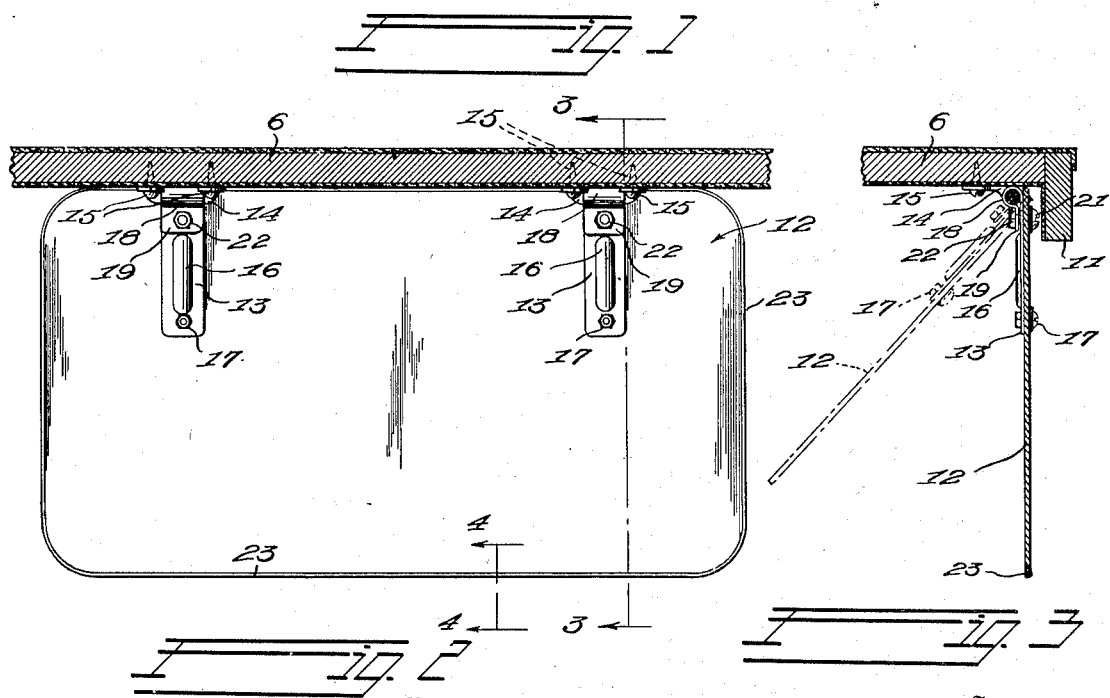
Inventors
George E. Gagnier
Bion C. Place
By
Strauch & Hoffman
Attorneys Dec. 19, 1933.  G. E. GAGNIER ET AL  1,940,540
AUTOMOBILE SUN AND GLARE SHIELD
Filed March 12, 1930  2 Sheets-Sheet 2
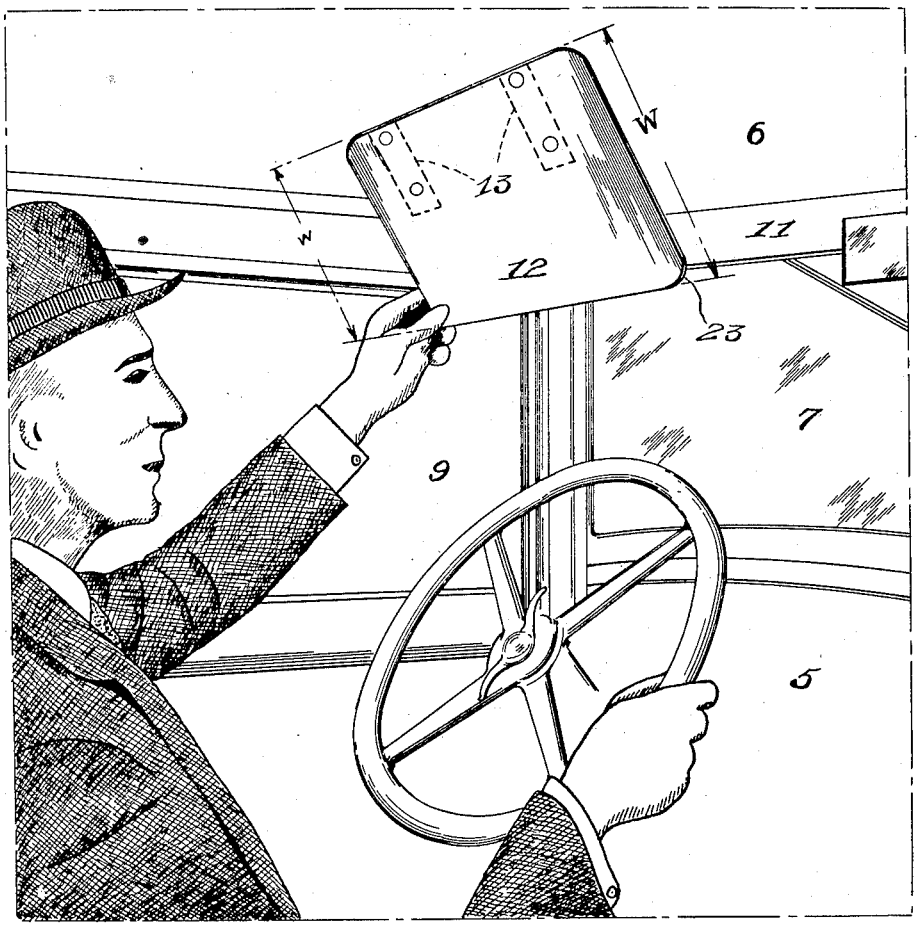
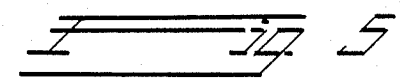
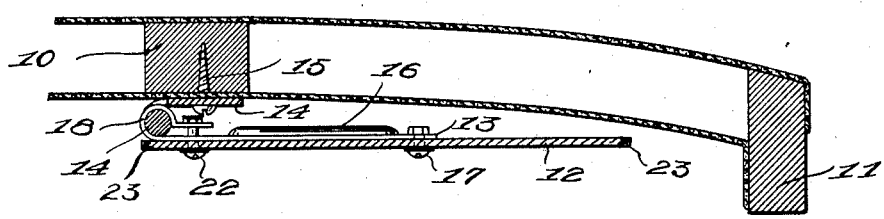
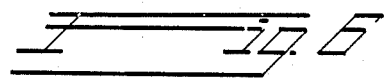
Inventors
George E. Gagnier
Bion C. Place
Strauch & Hoffman
Attorneys Patented Dec. 19, 1933

1,940,540

UNITED STATES PATENT OFFICE 1,940,540

AUTOMOBILE SUN AND GLARE SHIELD

George E. Gagnier and Bion C. Place, Detroit, Mich.

Application March 12, 1930. Serial No. 435,318

2 Claims. (Cl. 296—97)

This invention relates to a sun and glaring light shield or visor of the type intended for mounting within a road vehicle in, or adjacent to, the angle between the top of the vehicle and the glass of the windshield or body, and of the type that is intended to present a barrier to direct and blinding rays from the source of light without shutting off in any degree the necessary view of the road, directly in front of and adjacent the vehicle, from the eyes of the operator.

Devices heretofore proposed for similar purposes have been either ineffectual for the purpose specified, or too cumbersome and unsightly, or too complex and expensive. It has been common in prior devices of this nature to utilize transparent shields such for example, as colored or treated glass or celluloid, for direct interposition between the driver's eyes and the source of glaring light. Designed primarily to reduce the intensity of the headlights of approaching vehicles, they perform such intended function after a certain fashion but in so doing they render the roadway, directly in front of the equipped vehicle, more or less invisible to the driver of said vehicle. This condition actually increases the hazards of collision and running off the road, and results particularly in great danger as respects pedestrians walking upon the right hand edges of the highway. Such devices, moreover, are subject to breakage, especially when quickly grabbed for manipulative adjustment by the driver, and the colored light transmitted to the operator's eyes results in his annoyance and discomfort. Other proposed devices are complex and require much space in the car body. Still others are so lacking in esthetic appearance that the automobile owner of today, who is severely critical of the interior appointments of his vehicle body, refuses to adopt them.

Accordingly, it is a primary object of our invention to overcome all of the above enumerated defects and disadvantages of prior sun visors and anti-glare shields.

It is an object of this invention to provide an opaque adjustable shield designed for mounting within the dihedral angle formed by the vehicle roof and the windshield or side windows of a vehicle body, as, for example, by attaching the shield to any of the cross-bows of the vehicle roof, or upon the windshield header bar.

Another object of the invention is to form a shield from a thin and light sheet of material, such as fibre panel, which shall be somewhat flexible and yet sufficiently strong to permit manipulation thereof without permanent distortion, deformation or breakage; and in this connection to provide the shield with a metallic reinforcing and finishing edge.

It is also an object of the invention to mount a shielding panel upon a frictional hinge and to form said panel of such thin and light material that it shall not overcome the friction of said hinges and accidentally swing itself downwardly from any selected position during the vibration and jarring of the vehicle body incident to its operation.

A further object is to utilize a common bolt or securing member having the dual function of securing the shield panel to the hinge and of adjusting the frictional gripping action of said hinge.

Another major object of this invention lies in the provision of an opaque shield adapted to be mounted at the rear of the windshield, as upon one of the curved cross-bows of the roof, and having an inclined edge adapted to define the upper or more distant edge of the view of the road offered to the driver, which edge is so inclined with respect to the opposite edge that the shield is deeper (wider in vertical dimension) at that end which is adjacent the right forward corner of the vehicle body (and vice versa if the vehicle is of the right-hand drive type). The object of so inclining the lower edge of the shield, when the latter is attached to the roof cross-bow, is to neutralize the effect of the curvature of said cross-bow so that the lower edge of the shield shall be horizontal, with respect to the ground, after attachment to the curved cross-bow.

A still further object of the invention is to provide a shielding panel which is ornamental in appearance and which may be swung out of use into such position as to be neatly disposed and substantially invisible.

Another object is to provide a simple shielding device, so inexpensive and so conveniently mounted in any standard vehicle body as to permit of its universal adoption. Other and further objects of our invention will appear from a study of the following detailed description when taken in connection with the accompanying drawings, in which:

Figure 1 represents a view, looking forwardly into the rear end of a vehicle body section and showing a preferred embodiment of the device of this invention and the manner in which it is disposed with respect to the windshield and the driver's seat.

Figure 2 shows a partial vertical section through the roof of the vehicle just adjacent the rear (visible) side of the shield in Figure 1.

Figure 3 represents a vertical section cut from Figure 2 by a plane indicated by line 3—3, looking in the direction of the arrows.

Figure 4 is an enlarged fragmentary section taken along line 4—4 of Figure 2.

Figure 5 illustrates, in somewhat diagrammatical perspective, the device of Figures 1-4 and a preferred manner of mounting it upon the roof at a substantial distance to the rear of the windshield.

Figure 6 shows a partial detailed section of form shown in Figure 5, taken on a vertical plane longitudinally of the vehicle.

With reference now to the drawings, in which like characters are employed to designate like parts, numeral 5 indicates, generally, any type of road vehicle body having a roof or top 6, a windshield 7, a driver's seat 8, and a plurality of transparent windows 9. As is conventional in bodies of the type selected for illustration a header bar 11 is disposed between the roof and the upper side of the windshield.

The device about to be described may be attached readily and conveniently to the roof just above or to the rear of the windshield 7 or even the windows 9, or it may be secured to the header bar 11 or to the upper closure frame portions of the windows 9. For purposes of illustration, however, we have shown two methods of attaching it to the body roof, directly in front of the driver's seat.

The illustrated shielding device of this invention comprises a panel 12 mounted in position by a pair of friction hinges, each of which comprises a bracket 13 frictionally engaging a U or clevis-shaped hinge element 14, that is secured by screws 15 to the roof 6 above the header bar 11 (Figs. 1-4), or to a cross-bow 10 of the top (Figs. 5 and 6). Each clevis 14 is so designed that its leg portions are adapted to receive the attaching screws 15, and its pintle portion interconnecting the legs is disposed horizontally in parallelism with the panel 12. Each bracket 13 comprises a strip of thin metal so stamped as to provide an integral strengthening rib 16, the lower end of the strip being secured to the panel by a fastening assembly 17 and the upper end being bent backward upon itself to form a pintle-engaging loop 18 and a friction adjusting tab 19. Just below the loop 18 a screw bolt 21 passes through the panel, the body portion of bracket 13 and the tab 19 to engage a nut 22. It will be observed that bolt 21 thus serves the dual function of attaching the upper end of the bracket to the panel and of varying (when manually rotated) the size of the loop 18 thereby to adjust the frictional engagement of loop 18 upon the pintle or clevis 14. It should further be observed that the entire device may be applied to any vehicle body merely by turning four small screws 15 into place.

The panel 12, approximately rectangular in shape, preferably is made from a thin sheet of durable fibre board. Its corners may be rounded and its surface colored or coated to harmonize with the interior appointments of the vehicle body. Due to its light weight the panel has no great tendency to overcome the frictional resistance of the hinges and oscillate about the clevis during vibration and jarring of the vehicle body. As is obvious, and illustrated in broken lines in Figure 3, the lower edge of the panel may be grasped and quickly adjusted to any one of an infinite number of positions that may be selected by the driver to bar the blinding rays of the sun or of approaching headlights.

Since the panel is relatively thin it has sufficient flexibility to prevent cracking or breaking thereof when the lower edge is pushed or pulled by the driver. To increase the strength of the panel and to reinforce its edges, a metallic strip of material 23 (see also Figure 4) is bound around said edges and crimped thereon with its parallel side walls 24 substantially flush with the panel surfaces. This metallic strip likewise prevents the exposure of any rough and uneven edges of the fibrous panel and lends to it an attractive and decorative appearance.

With particular reference now to Figures 5 and 6, wherein the shielding device is shown attached to a cross-bow of the top substantially midway between the windshield and the driver's eyes, the right end of the panel 12 is made wider than the left end thereof, these respective widths being indicated with arrows and letters W and w in Figure 5. This is done to counteract the inclination that the free lower edge of the panel would otherwise have as the result of the cross-bow being bowed upwardly from the sides of the top toward the longitudinal center line thereof. The lower edge of the suspended panel is thus substantially horizontal. In the event the vehicle top is flat or almost so, it will be understood that W and w may be made equal.

When not in use the shielding panel may be swung upwardly until its free horizontal edge is substantially in contact with the roof, in which position the device is so neatly and compactly folded as to be practically invisible (see, for illustration, Fig. 6). This is true, whether the device is attached to the roof or to vertical portions of the body immediately adjacent the roof.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What we claim and desire to secure by United States Letters Patent is:—

1. A glare shield for an automobile vehicle designed for attachment within the vehicle body, comprising a thin non-shatterable but substantially inflexible panel of a size sufficient to shield the eyes of an occupant of the vehicle from the glaring or blinding rays from a source of artificial light or from the sun when relatively close to the horizon, and means for pivotally mounting said panel within said body with one of its edges immediately adjacent one of the surfaces forming the dihedral angle between the top of the body and a pane of glass of said body in such manner that said panel may be swung from a vertical position to a position in which it is substantially flush and in parallelism with said top, said mounting means comprising frictionally engaged hinge elements, one of which is adapted to be secured to the vehicle body and means for adjusting the frictional engagement of said elements, said adjusting means also serving to attach the other of said hinge elements to said panel.

2. A glare shield for an automobile vehicle designed for attachment within the vehicle body said shield comprising an opaque panel of light fibrous material and of a size sufficient to shield the eyes of an occupant of the vehicle from the glaring or blinding rays from a source of artificial light or from the sun when relatively close to the horizon, and means for pivotally mounting said panel within said body for movement from a plurality of inclined glare shielding positions to a substantially horizontal position where the same is disposed out of the way and flush against a surface of the vehicle, said means comprising a set of frictional hinge elements secured directly to that face of the panel which is uppermost when the same is in horizontal position, whereby, when it is desired to place said panel in operative position, the lower edge of the same may be grasped and the panel swung downwardly about its pivot and placed in an indefinite number of adjusted positions, and when said panel is swung into inoperative position against the vehicle surface, the hinge elements will be concealed.

GEORGE E. GAGNIER.
BION C. PLACE.